United States Patent

Verma et al.

(10) Patent No.: US 7,764,660 B2
(45) Date of Patent: Jul. 27, 2010

(54) REGISTRATION OF A WLAN AS A UMTS ROUTING AREA FOR WLAN-UMTS INTERWORKING

(75) Inventors: Shaily Verma, Mumbai (IN); Charles Chuanming Wang, Jamison, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/518,996

(22) PCT Filed: Jun. 20, 2003

(86) PCT No.: PCT/US03/19675

§ 371 (c)(1),
(2), (4) Date: Dec. 21, 2004

(87) PCT Pub. No.: WO04/002051

PCT Pub. Date: Dec. 31, 2003

(65) Prior Publication Data

US 2005/0239461 A1 Oct. 27, 2005

Related U.S. Application Data

(60) Provisional application No. 60/390,811, filed on Jun. 21, 2002.

(51) Int. Cl.
*H04W 4/00* (2009.01)
(52) U.S. Cl. .................... 370/338; 455/435.1
(58) Field of Classification Search ........... 455/433, 455/448, 456.5, 406, 405, 414.1–414.2, 445, 455/552, 555, 411, 432.2, 554.2, 425.1, 435.2, 455/435.1; 370/338, 328, 401
See application file for complete search history.

(56) References Cited

U.S. PATENT DOCUMENTS

| 6,466,556 | B1 * | 10/2002 | Boudreaux | 370/331 |
| 2002/0085516 | A1 * | 7/2002 | Bridgelall | 370/329 |
| 2002/0168969 | A1 | 11/2002 | Koskinen et al. | |
| 2003/0014367 | A1 | 1/2003 | Tubinis | |
| 2003/0031160 | A1 | 2/2003 | Gibson Ang et al. | |

(Continued)

FOREIGN PATENT DOCUMENTS

JP 2001508971 A 7/2001

(Continued)

OTHER PUBLICATIONS

Search Report Dated Nov. 5, 2003.

(Continued)

*Primary Examiner*—Melody Mehrpour
(74) *Attorney, Agent, or Firm*—Robert D. Shedd; Joseph J. Opalach; Catherine A. Cooper

(57) ABSTRACT

A system for employing a wireless local area network (WLAN) as a cellular network routing area includes a cellular network, which is capable of determining a location where a service request is made. The cellular network includes a packet-based support node B, which determines if the request can be serviced through a WLAN, which is identified in the cellular network as a routing area. Packet data protocol context is maintained while servicing the request using the WLAN to provide smooth interworking between the WLAN and the cellular network.

16 Claims, 4 Drawing Sheets

U.S. PATENT DOCUMENTS

| | | | |
|---|---|---|---|
| 2003/0114158 A1* | 6/2003 | Soderbacka et al. | 455/436 |
| 2003/0119481 A1 | 6/2003 | Haverinen et al. | |
| 2003/0134638 A1* | 7/2003 | Sundar et al. | 455/435 |
| 2003/0157937 A1 | 8/2003 | Oikarinen et al. | |
| 2003/0171112 A1 | 9/2003 | Lupper et al. | |
| 2004/0037242 A1* | 2/2004 | Shi et al. | 370/329 |
| 2004/0203765 A1* | 10/2004 | Das et al. | 455/435.1 |
| 2004/0228347 A1* | 11/2004 | Hurtta et al. | 370/395.2 |
| 2006/0050667 A1* | 3/2006 | Verma et al. | 370/338 |

FOREIGN PATENT DOCUMENTS

| | | |
|---|---|---|
| WO | 00/76145 A1 | 12/2000 |
| WO | 01/91382 A1 | 11/2001 |

OTHER PUBLICATIONS

Nokia, UMTS-Wireless LAN Interworking, 3GPP TSG SA1 #14 Meeting, Oct. 30, 2001, URL http://www.3gpp.org/ftp/tsg_sa/WG1_Serv/TSGS1_14-Kobe/docs/S1-011018.zip.
Supplementary European Search Report dated Dec. 10, 2009.

\* cited by examiner

REGISTRATION OF A WLAN AS A UMTS ROUTING AREA FOR WLAN-UMTS INTERWORKING

This application claims the benefit, under 35 U.S.C. §365 of International Application PCT/US03/19675, filed Jun. 20, 2003, which was published in accordance with PCT Article 21(2) on Dec. 31, 2003 in English and which claims the benefit of U.S. provisional patent application No. 60/390,811, filed Jun. 21, 2002.

FIELD OF THE INVENTION

The present invention generally relates to network communications and, more particularly, to a method and system for interworking a Wireless Local Area Network (WLAN) with a UMTS (Universal Mobile Telecommunications System) network for improved low cost service of data, voice and multimedia content delivery.

BACKGROUND OF THE INVENTION

Universal Mobile Telecommunications System (UMTS) is a 'third generation' (3G) mobile communications system developed within a framework known as IMT-2000 (International Mobile Telecommunications-2000). UMTS will play a key role in creating the mass market for high-quality wireless multimedia communications. UMTS will enable many wireless capabilities, delivering high-value broadband information, commerce and entertainment services to mobile users via fixed, wireless and satellite networks. UMTS will speed convergence between telecommunications, information technology, media and content industries to deliver new services and create revenue-generating services. Compared to its 2G or 2.5G wireless cellular counterparts, UMTS will deliver low-cost, high-capacity mobile communications with data rates on the order of 2 Mbit/sec under stationary conditions with global roaming and other advanced capabilities.

One drawback of the UMTS network is the high cost of spectrum and low data rates as compared to WLANs (Wireless Local Area Networks). The overall cost of a cellular infrastructure is very high compared to the cost of a WLAN infrastructure both in terms of cost of the spectrum, which in the case of WLAN is free, and the overall system cost for the supported bandwidth. On the other hand, it is more difficult for a WLAN to have the wide area coverage offered by a cellular system. In order to have the advantages from both cellular and WLAN technologies, the WLAN may be an extension of the cellular network in hotspot areas.

Since Universal Mobile Telecommunications System (UMTS) networks use expensive bandwidth and end up delivering low data rates, it would be advantageous to utilize wireless local area networks (WLANs) in hotspots for high data rates and to utilize UMTS for ubiquitous coverage. To accomplish this, the mobile terminal will need to transition quickly and easily from one network to another.

SUMMARY OF THE INVENTION

The present invention provides a system and method, which registers WLAN coverage areas as a UMTS routing area (RA). In the system according to the present invention the user equipment (UE or mobile station) benefits from battery conservation due to reduced signaling and easy transitions to and from UMTS or GPRS systems.

A system for employing a Wireless Local Area Network (WLAN) as a cellular network routing area includes a cellular network, which is capable of determining a location where a service request is made. The cellular network includes a packet-based support node, which determines if the request can be serviced through a WLAN, which is identified in the cellular network as a routing area. Means for maintaining packet data protocol (PDP) context while servicing the request using the WLAN provides smooth handoff between the WLAN and the cellular network.

A method for registering a Wireless Local Area Network (WLAN) as a cellular network routing area, includes determining a location of a service request from a user within a cellular network, and determining whether the location is in or near a WLAN access point. If at or near the WLAN access point, the method maintains packet data protocol (PDP) context while servicing the request using the WLAN such that interworking between the WLAN and the cellular network is provided.

BRIEF DESCRIPTION OF THE DRAWINGS

The advantages, nature, and various additional features of the invention will appear more fully upon consideration of the illustrative embodiments now to be described in detail in connection with accompanying drawings wherein.

Figure 1:
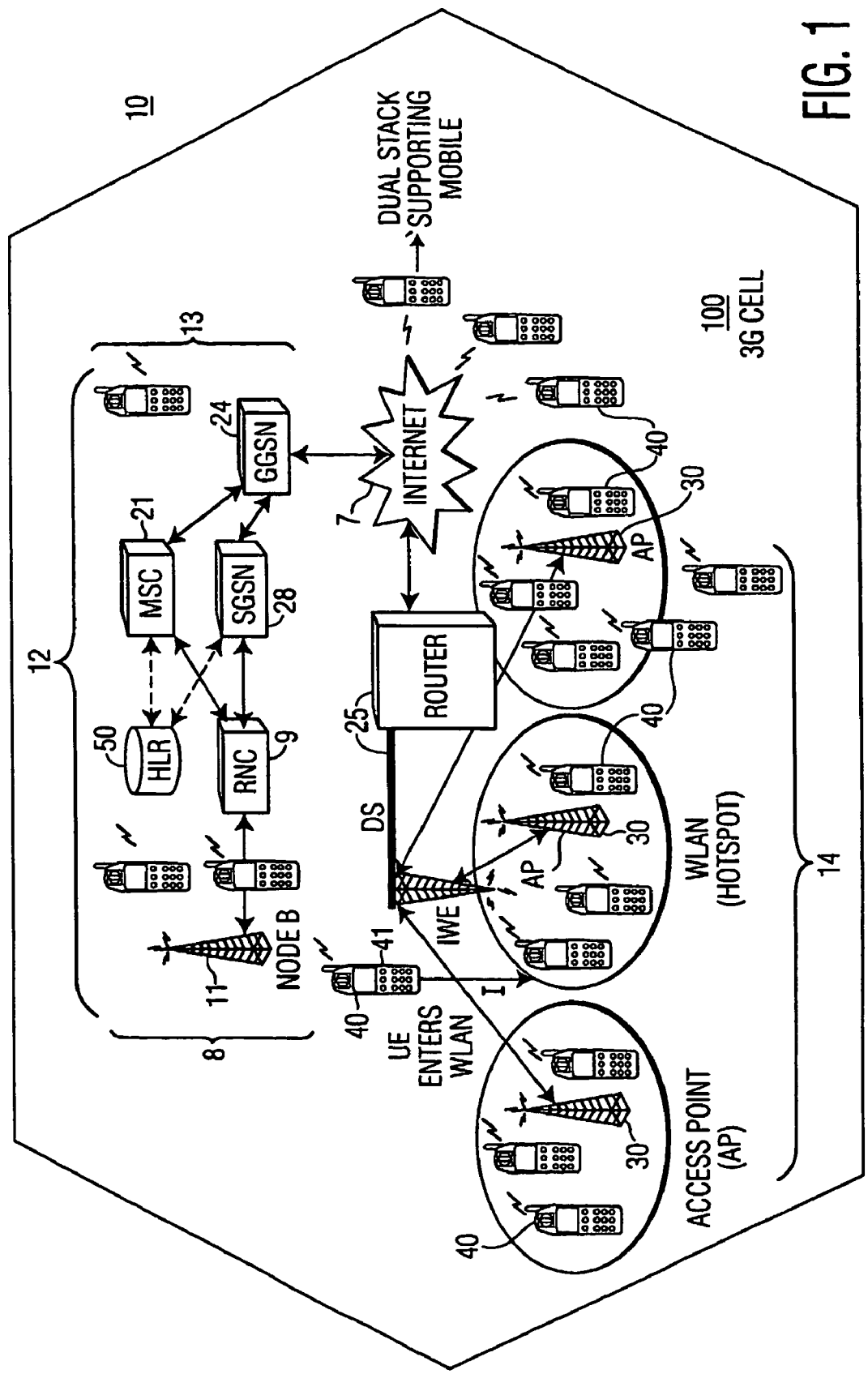
FIG. 1 is an exemplary system architecture for a system employing WLAN as a routing area in a cellular system in accordance with the present invention.

It should be understood that the drawings are for purposes of illustrating the concepts of the invention and are not necessarily the only possible configuration for illustrating the invention.

DETAILED DESCRIPTION OF THE INVENTION

The present invention provides a method and system for registering a Wireless Local Area Network (WLAN) coverage area as a Universal Mobile Telecommunications System (UMTS) routing area (RA). User equipment (UE) or mobile station (MS) benefits from battery conservation due to reduced signaling and easy transitions to and from the UMTS or other cellular network (e.g., a GPRS system), preferably through maintenance of the PDP (Packet Data Protocol) context. The UMTS network also benefits due to reduced signaling load.

A mobile user connects to the UMTS core network (SGSN/MSC and GGSN) via a radio access network (Node B and RNC). A WLAN station or Mobile terminal (MT) attaches to the Access Point (AP) in the infrastructure mode of a WLAN. In order to move from the UMTS network to the WLAN network and vice versa, the mobile user must support the stacks of both the UMTS UE and the WLAN MT (mobile terminal).

One way to enable smooth handoff between cellular cells (e.g., 3G cells) and WLAN hotspot coverage areas, the re-entry into the UMTS network is kept smooth by keeping the PDP context active while a UE is in the WLAN coverage area.

As a result, battery energy and UMTS signaling channels have to be used periodically to signal to the UMTS core network (CN) to keep the PDP context active. Moreover, if periodic RA messages are not exchanged in the idle state, the UE "detaches" and needs to start an "attach" procedure when returning to the UMTS network. This can result in a large handoff delay.

The present invention provides a method to keep the PDP context alive when a user is in the WLAN coverage area resulting in conservation of the UE battery and network resources. The present invention restricts usage of transmitting and receiving UMTS radios for communications while in WLAN coverage area. However, the UE remains "attached" to the UMTS network and maintains a PDP context so as to have a smooth handoff upon re-entry.

It is to be understood that the present invention is described in terms of a 3G UMTS system with WLANs; however, the present invention is applicable to any cellular system with WLANs in which data, voice and video multimedia content can be transferred or telecommunications services can be provided. In addition, the present invention is applicable to any wireless communication system including fixed wireless network, satellite links, etc. where the user equipment has access to a WLAN or WLAN(s).

It should also be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

Referring now in specific detail to the drawings in which like reference numerals identify similar or identical elements throughout the several views, and initially to FIG. 1, a system architecture 10 within a $3^{rd}$ Generation Cellular Cell 100 (3G cell) is illustratively shown for integrating voice, data, video and other services over wireless/radio networks. System architecture 10 is presented as an exemplary WLAN-UMTS environment for employing the inventive method and system in accordance with the present invention. Details of the individual block components making up the system architecture which are known to skilled artisans will only be described in details sufficient for an understanding of the present invention.

The present invention is illustratively described in terms of a UMTS network 12 and a WLAN wireless network 14 (e.g., IEEE 802.11 and HIPERLAN2 standards may be employed by these networks). UMTS mobile network 12 (e.g., a third generation (3G) network) communicates with a radio access network (RAN) 8 which comprises a Node B 11 and Radio Network Controller (RNC) 9. WLAN (14) is preferably connected to UMTS network (12) through an intra-PLMN (Public Mobile Land Network) interface or backbone (not shown). The RAN 8 in turn is attached to a Core Network (CN) 13 which comprises packet based services such as a SGSN (Serving GPRS Support Node) 28, circuit based services, such as a MSC (Mobile Switching Center) 21 and gateways to other PLMNs, such as GGSN (Gateway GPRS Support Node) 24. Core network 13 supports connections/interfaces with public switched telephone networks (PSTN) (not shown) and the Internet 7.

Other components may be included in a core network 13. For example, a home location register (HLR) 50 may be provided which stores the home locations of mobile stations (MS) 40. By the present invention, network 12 (e.g., a PLMN) is interfaced to a wireless LAN 14 through a Gn (or Gp) interface by employing an interworking function 25. MS 40 connects at an access point 30, and MS 40 may roam between the radio access networks.

The WLAN 14 includes a plurality of access points 30 which are provided to permit wireless user equipment (UE) or mobile stations (MS) 40 to access and use the WLAN. By the present invention, the IWF 25 interacts with the UMTS network 12 and interfaces (through IWF 25) to a WLAN environment.

UMTS-WLAN Interworking

The 3G UMTS mobile 40 communicates with the radio access network (RAN) 8 comprising of Node B 11 and Radio Network Controller (RNC) 9. The RAN 8 in turn is attached to the Core Network (CN) 13 which comprises SGSN 28 (packet based services), MSC 21 (circuit based services) and GGSN 24 (gateway to other PLMNs). Diverting as much data as possible from UMTS to WLAN saves costly UMTS spectrum and invaluable data bandwidth. It is advantageous to replace UMTS with unlicensed band, high data rate WLANs, such as IEEE 802.11 and ETSI Hiperlan2, to save UMTS radio resources and increase the efficiency of the UMTS RAN 8.

To accomplish this, one embodiment employs a dual stack protocol for use with the mobile units. Preferably, the dual stack protocol includes the stack of the UMTS UE and the WLAN MT (mobile terminal).

In FIG. 1, architecture 10 shows WLAN-UMTS interworking. FIG. 1 is illustrative of one way of coupling functional components. Other ways of coupling these and other components is also contemplated and may be implemented in accordance with the present invention. A number of access points 30 are tied back to the IWF (interworking function) 25, which in turn is connected to the 3 G network 12 either through the Internet 7 or through a dedicated link to a UMTS network node (e.g., RNC or SGSN or GGSN) based on the coupling. The functionality of the IWF 25 depends on the coupling between the WLAN and UMTS networks.

Figure 2:
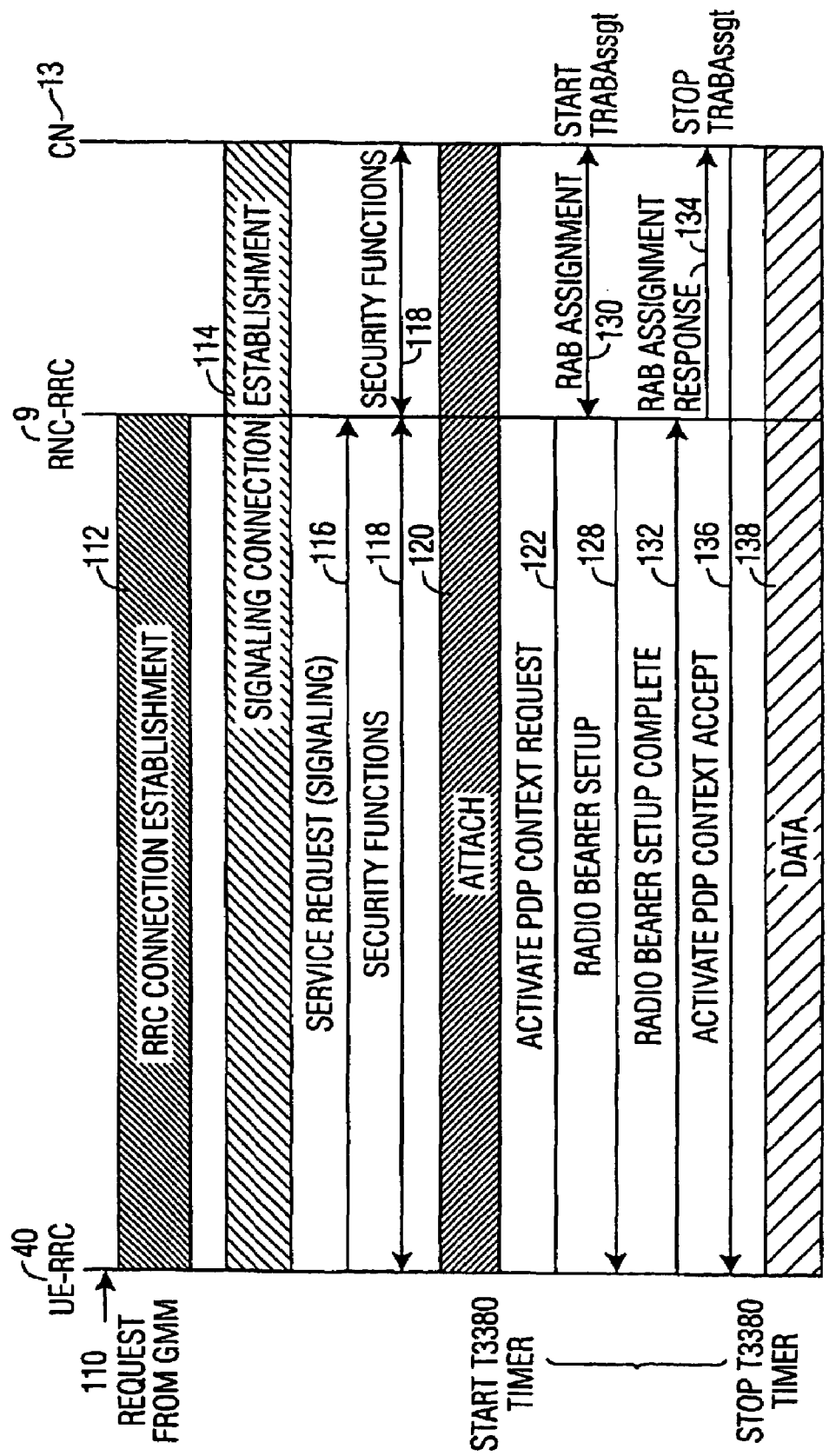
FIG. 2 is a diagram showing a setup procedure for setting up data transfer in a WLAN in a cellular environment in accordance with an embodiment of the present invention.

Referring to FIG. 2, a diagram is shown indicating the steps in establishing data bearers in the UMTS network registration of the WLAN coverage area as a UMTS routing area. Once the mobile station 40 is switched on, the mobile station 40 finds a suitable cell (cell selection), tries to be "attached" to the network using a signaling connection and performs regular routing area updates to remain attached. A request 110 is made from a GPRS mobile management layer (GMM) from UE 40. An RRC (Radio Resource Control) connection is established (112) between UE 40 and RNC 9 followed by a signaling connection establishment (114) to CN 13. Then, a service request (116) is made from UE 40 to RNC 9. Then, known security functions (118) are carried out between the respective components. After, the security checks are complete, UE 40 can be "attached" (120) to the cellular network.

Next, the PDP context activation request (122) is sent by UE 40. The CN 13 then starts the RAB (Radio Access Bearer) setup procedure, which includes a radio bearer setup (128), RAB assignment (130), radio bearer setup complete signal (132), and RAB assignment response (134). Finally, a PDP Context Accept (136) is sent to UE 40. Timer T3380 controls the duration of activation of the PDP context while Timer $T_{RABassignment}$ controls the duration of the RAB setup as illustrated in FIG. 2. Now, data transmission can occur over the RAB that has been set up. Data (138) may now be exchanged. UE 40 can now pass into a WLAN to receive data while maintaining the "attached" state with the UMTS or other cellular system.

In UMTS, different levels of mobility procedures are executed depending upon the UE state. For example, when a UE is in Packet Mobility Management (PMM) Idle mode, the UE location is known at the SGSN 28 (CN 13) with the accuracy of a routing area and the UE performs periodic RA updating procedures. When a UE is in PMM Connected mode, the location of the MS is tracked by the serving RNC.

Routing Area Identifier (RAI), defined by an operator, identifies one or several cells. In UMTS, RAI is broadcast to UEs in Idle mode, and is notified to MSs in Connected mode on established RRC connections as GMM system information. Irrespective of the PMM state, the MS performs a routing area update if the RAI changes. Thus, a routing area update takes place when a UE detects that it has entered a new RA or when the periodic RA update timer has expired. The SGSN detects that it is an intra-SGSN routing area update by noticing that it also handles the old RA. In this case, the SGSN has the necessary information about the MS and there is no need to inform the GGSNs or the HLR about the new MS location. A periodic RA update is always an intra SGSN routing area update.

Figure 3:
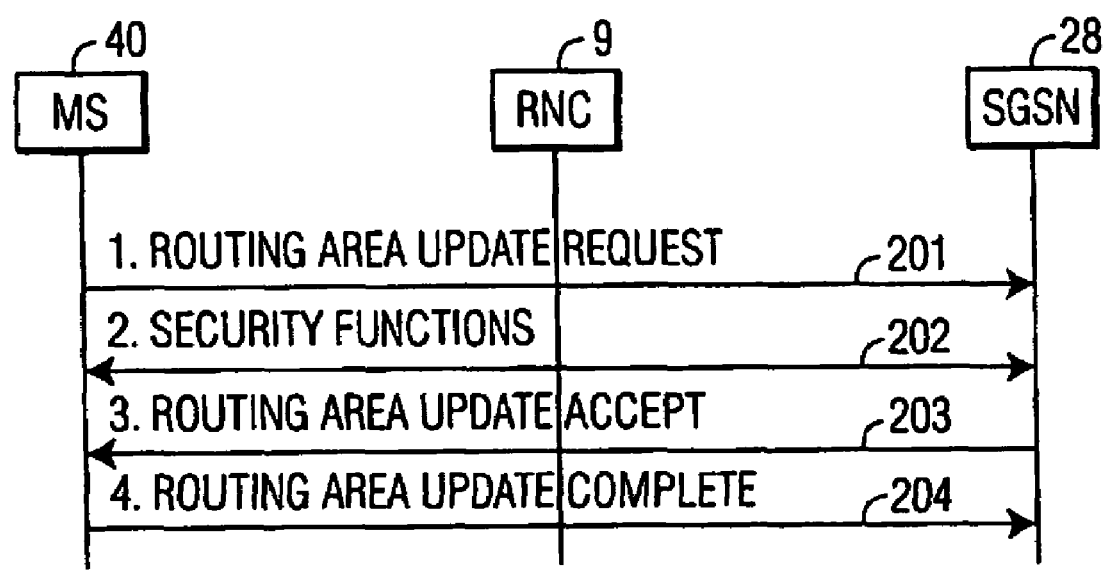
FIG. 3 is a diagram showing a routing area update procedure in accordance with an embodiment of the present invention.

Referring to FIG. 3, an intra SGSN routing area update procedure is illustratively depicted. MS 40 sends a routing area update request 201 to SGSN 28. Security functions 202 are carried out to ensure access is granted to appropriate users. Then, a routing area update accept 203 is issued from the SGSN 28. Finally, a routing area update complete 204 acknowledges that the routing area has either been updated or does not require updating.

A Periodic RA Update timer T3312, known to those skilled in the art, monitors the periodic RA update procedure in the MS 40. The length of the periodic RA update timer is sent in the Routing Area Update Accept (203) or Attach Accept message. The periodic RA update timer is unique within an RA (e.g., default may be 54 minutes). The timer T3312 is reset and started with its initial value, when the MS goes from PMM-Connected to PMM-Idle mode. The timer T3312 is stopped when the MS enters PMM-CONNECTED mode.

When timer T3312 expires, the periodic routing area updating procedure is started, and the timer is set to its initial value for the next start. The network supervises the periodic routing area updating procedure by means of a Mobile Reachable timer. The Mobile Reachable timer may be longer than the periodic RA update timer (by 4 minutes as a default value). In accordance with the present invention, WLAN coverage areas can be made into UMTS routing areas (RA). The RAI can be used to indicate to the MS which RA it should use in case of overlapping RAs as in the case of WLAN and UMTS RA overlap.

Referring again to FIG. 1, if a PDP context has been already established at the time of entering the WLAN, there are two possible cases:

1. If the UE is in PMM Idle Mode

The UE location is known in the 3G-SGSN with an accuracy of a routing area. The UE 40 is expected to send periodic RA update messages in PMM idle mode. The WLAN IWF can broadcast the new RAI (pre-allocated by the SGSN 28). By comparing the RAI stored in the UE's GMM context with the RAI received from the IWF 25, the UE detects that an RA update (intra-SGSN) needs to be performed. The UE sends a Routing Area Update Request to the SGSN. The SGSN can recognize from the new RAI sent by the UE that it is in a WLAN coverage area now. Since the length of the periodic RA update timer that is sent in the Routing Area Update Accept (201 in FIG. 3) message is unique within an RA, the length of the periodic RA update timer, that is sent in the Routing Area Update Accept from the SGSN to the UE, is set to a largest value permissible by the network. This is so that while the UE is in the WLAN, it does not have to keep sending periodic RA updating messages at the same rate as it is in a UMTS cell.

This restricts the usage of both radios for WLAN and UMTS and thereby avoids unneeded UMTS signaling. This, in turn, results in conservation of the UE battery and network resources, as periodic RA messages would need the PS (packet switched) signaling connection to be re-established each time. Moreover, since the SGSN 28 is capable of determining from the RAI update message which WLAN the UE is in, and the WLAN area may be approximately 100 m, location based services and high data rate services can advantageously be provided by the 3G operator to the user.

As soon as the UE moves out of the WLAN coverage area, the RAI changes, so UE shall perform an RA update procedure. If data needs to be sent, a PS signaling connection can be established and a service data request can be sent to the SGSN by the UE to set up the data bearers in the UMTS network.

2. If the UE is in PMM Connected Mode

The new RAI is notified to MSs in RRC Connected mode on established RRC connections as GMM system information. Depending on the coupling for the interworking (25), the UE now establishes a data plane via the WLAN system and releases the radio resources in the UMTS network (which is one of the advantages of Interworking). The UE now falls in the PMM idle state. A preservation function 41 in the MS permits the active PDP contexts associated with the released RABs to be preserved without modification in the CN 13, and the RABs can then be easily re-established at a later stage. However, all active PDP contexts for a UE are lost when the GMM state changes to PMM-Detached.

One way to keep the re-entry into the UMTS network smooth is to keep the PDP context active while a UE is in the WLAN coverage area. Hence, the UE in the PMM idle state needs to keep making RA updates to avoid falling into the PMM-Detached state and losing the PDP context.

As soon as the UE moves out of the WLAN coverage area, the RAI changes, so UE performs an RA update procedure. If data needs to be sent, a PS signaling connection can be established and a service data request can be sent to the SGSN by the UE to set up the data bearers in the UMTS network.

Figure 4:
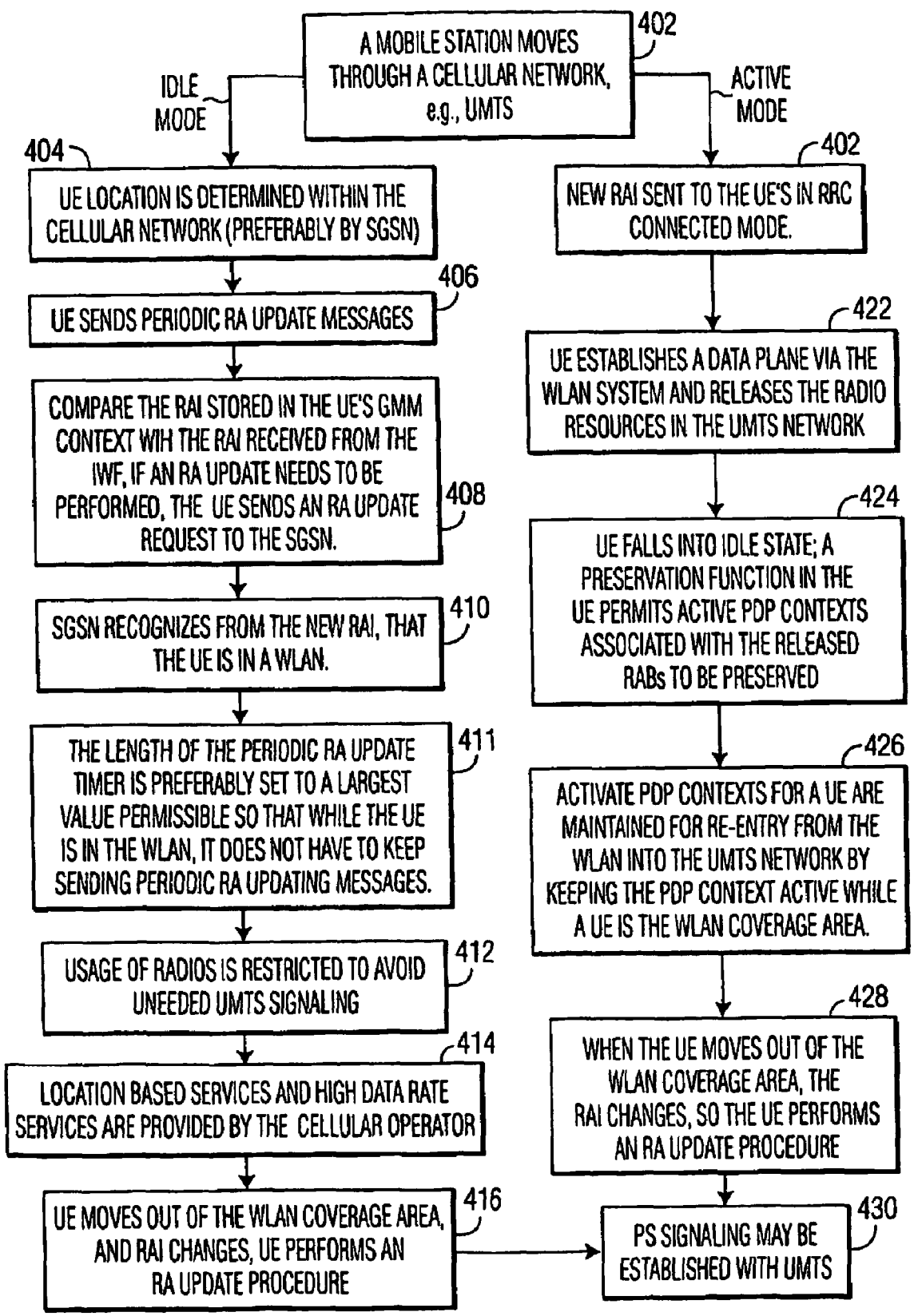
FIG. 4 is a block/flow diagram, which illustrates a system/method for WLAN registration as a UMTS routing area for WLAN-UMTS interworking in accordance with the present invention.

Referring to FIG. 4, a block/flow diagram is shown which illustrates a system/method for WLAN registration as a UMTS routing area for WLAN-UMTS interworking in accordance with the present invention. In block 402, a mobile station or user moves through a cellular network, e.g., a UMTS network. The user equipment (UE) may be in Idle mode or Connected mode. If in idle mode, the UE location is determined within the cellular network (preferably by an SGSN) with an accuracy of a routing area, in block 404. In block 406, the UE 40 sends periodic RA update messages in PMM idle mode. The WLAN IWF can broadcast the new RAI (pre-allocated by the SGSN).

In block 408, by comparing the RAI stored in the UE's GMM context with the RAI received from the IWF, the UE detects that an RA update (intra-SGSN) needs to be performed, and the UE sends a Routing Area Update Request to the SGSN. In block 410, the SGSN recognizes from the new RAI sent by the UE that the UE is in a WLAN coverage area now. Since the length of the periodic RA update timer that is sent in the Routing Area Update Accept message is unique within an RA, the length of the periodic RA update timer, that is sent in the Routing Area Update Accept from the SGSN to the UE, is preferably set, in block 411, to the largest value permissible by the network. While the UE is in the WLAN, it does not have to keep sending periodic RA updating messages. The cellular service providers are thereby able to control the loading of cells by shifting users to WLANs by having additional functionality in SGSNs to change RAIs of the users to that of a WLAN coverage area, if the UE is in the WLAN range (based on some location criterion in the SGSN).

In block 412, the usage of both radios for UE and UMTS are restricted to avoid unneeded UMTS signaling. This, in turn, results in conservation of the UE battery and network resources. In block 414, since the SGSN is capable of determining from the RAI update message, which WLAN the UE is in, and the WLAN area may be approximately 100 m, location based services and the cellular operator can advantageously provide high data rate services to the user.

In block 416, as soon as the UE moves out of the WLAN coverage area, the RAI changes, so UE shall perform an RA update procedure. If data needs to be sent, a PS signaling connection is established and a service data request can be sent to the SGSN by the UE to set up the data bearers in the UMTS network in block 430.

If in active mode, a new RAI is sent to the UE's in RRC Connected mode on established RRC connections as GMM system information in block 420. Depending on the system coupling for employing interworking between WLANs and the UMTS, the UE now establishes a data plane via the WLAN system and releases the radio resources in the UMTS network in block 422. In block 424, the UE falls into the PMM idle state; however, a preservation function in the MS permits active PDP contexts associated with the released RABs to be preserved without modification in the CN 13. These RABs can be re-established at a later stage.

In block 426, active PDP contexts for a UE are maintained for re-entry from the WLAN into the UMTS network by keeping the PDP context active while a UE is in the WLAN coverage area. This is preferably performed by the UE in the PMM idle state making RA updates to avoid falling into the PMM-Detached state and losing the PDP context.

In block 428, as soon as the UE moves out of the WLAN coverage area, the RAI changes, so the UE performs an RA update procedure. If data needs to be sent, a PS signaling connection can be established and a service data request can be sent to the SGSN by the UE to set up the data bearers in the UMTS network in block 430.

The present invention advantageously restricts radio usage and avoids unnecessary UMTS signaling for periodic RA updating procedures. This results in the conservation of the UE battery, and reduced signaling load for the UMTS network, as each periodic RA update would need the PS signaling to be re-established resulting in consumption of wireless and wired resources. In addition, the present invention maintains the PDP context, which can keep the handoff delay while re-entering the UMTS network low (if the PDP context does not have to be renegotiated by the network due to less resources). Avoiding periodic RAs without using the present invention would mean that the UE goes from PMM Idle to PMM Detached state. Hence, upon re-entry into the UMTS network, the UE would have to start from the "attach" procedure, activate the PDP context and only then could data bearers be established, resulting in large handover delays.

Since the SGSN is capable of determining location of a UE (by the RAI update message), which WLAN the UE is in, and the WLAN area is approximately 100 m in diameter, location based services and high data rate services can be provided by the 3G operator to the user. In addition, the present invention enables the mobile user to detect the entry into a WLAN cell (new RAI broadcast by the WLAN IWF) and exit from the WLAN cell (no longer able to hear the RAI broadcast from the WLAN IWF and can listen to the RAI broadcast by the nearest UMTS node B). Therefore, the mobile user is able to move between WLAN and UMTS systems smoothly using a single handheld device. The present invention also enables the 3G service providers to control the loading of UMTS cells by shifting UEs to WLANs in hotspots by having an additional functionality in the SGSN to change the RAI of the UE to that of a WLAN coverage area if the UE is in the WLAN range (based on some location criterion in the SGSN).

It is to be understood that the present invention may be implemented independently of the coupling between the WLAN and UMTS networks. Even with "loose" coupling, if the WLAN IWF broadcasts its RAI (pre-configured by the SGSN/3G operator) and the UE informs the SGSN about its RAI change (using its UMTS connection that it had while entering the WLAN), the SGSN can keep the PDP context alive as it can identify the RAI as being that of a WLAN and set a large periodic RA update timer value.

Having described preferred embodiments for WLAN registration as a UMTS routing area for WLAN-UMTS interworking (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims.

The invention claimed is:

1. A method for registering a wireless local area network as a wireless network routing area, comprising the steps of:
   determining a location of a service request from a user within a wireless network, which comprises a packet-based support node;
   determining whether the location is in or near a wireless local area network access point;
   if at or near the wireless local area network access point, maintaining packet data protocol context while servicing the service request using the wireless local area network such that interworking between the wireless local area network and the wireless network is provided.

2. The method as recited in claim 1, wherein the step of maintaining packet data protocol context while servicing the service request using the wireless local area network includes restricting radio signaling between a user and the wireless network while using the wireless local area network.

3. The method as recited in claim 1, further comprising the step of setting a periodic routing area update timer value while the user is in the wireless local area network to reduce signaling while a user is in the wireless local area network.

4. The method as recited in claim 1, further comprising the step of establishing packet switched signaling connection through the packet data protocol context when exiting the wireless local area network.

5. The method us recited in claim 1, further comprising the step of controlling loading of wireless cells by shifting user traffic service to wireless local area networks.

6. The method as recited in claim 1, wherein the interworking between the wireless network and the wireless local area network is provided by:
   uniquely identifying the wireless local area network as the wireless network routing area of the wireless network; and
   once identified, setting a routing area update timer to reduce a number of routing area updates to the wireless network.

7. The method as recited in claim 1, wherein the step of maintaining the PDP context includes maintaining the packet data protocol context to reduce handoff delay when re-entering the wireless network.

8. The method as recited in claim 1, further comprising the step of enabling wireless service providers to control the loading of cells by shifting users to wireless local area networks by changing routing area identifiers of the users to that of a wireless local area network coverage area.

9. A system for employing a wireless local area network as a wireless network routing area, comprising:
- a wireless network, which is capable of determining a location where a service request is made;
- the wireless network comprising a packet-based support node, which determines if the request can be serviced through a wireless local area network;
- means for maintaining packet data protocol context while servicing the request using the wireless local area network to provide smooth handoff between the wireless local area network and the wireless network.

10. The system as recited iii claim 9, wherein the means of maintaining packet data protocol context includes a preservation function provided in a mobile station.

11. The system as recited in claim 9, further comprising a unique routing area identifier, which identifies the wireless local area network in the wireless network.

12. The system as recited in claim 9, further comprising a wireless local area network coverage area to reduce signaling while a user is in the wireless local area network coverage area.

13. The system as recited in claim 9, further comprising an interworking function for establishing and maintaining user services between the wireless local area network and the wireless network.

14. The system as recited in claim 9, wherein the wireless network includes a Universal Mobile Telecommunications System.

15. The system as recited in claim 9, wherein the means for maintaining packet data protocol context further comprises a radio access bearer setup procedure for establishing interworking between the wireless network and the wireless local area network.

16. The system as recited in claim 9, wherein the cellular network learns if a user is in a wireless local area network coverage area via a routing area identifier update message.

* * * * *